(12) United States Patent
Gibbons et al.

(10) Patent No.: US 6,295,204 B1
(45) Date of Patent: Sep. 25, 2001

(54) LINEAR SECURITY MECHANISM FOR ENCLOSURE

(75) Inventors: Clifford A. Gibbons, Round Rock; Steven L. Sands; Timothy Radloff, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/299,505

(22) Filed: Apr. 26, 1999

(51) Int. Cl.[7] .................................................... G06F 1/16
(52) U.S. Cl. ......................... 361/726; 361/679; 361/681; 361/683; 361/684; 361/685; 361/686
(58) Field of Search ........................... 361/679, 683–686, 361/726

(56) References Cited

U.S. PATENT DOCUMENTS 5,691,879 * 11/1997 Lopez et al. ......................... 361/685

* cited by examiner

Primary Examiner—Leo P. Picard
Assistant Examiner—Yean-Hsi Chang
(74) Attorney, Agent, or Firm—Skjerven Morrill MacPherson LLP; Stephen A. Terrile; Mary Jo Bertani

(57) ABSTRACT

A lock assembly for retaining computer peripheral devices in a housing. The lock assembly includes a spring-loaded lock bar that is movable between an unlock and a lock position. The lock bar is secured in the lock position by engaging a lock pin in one end of the lock bar. The lock pin is coupled for linear movement to a rotateable lock cylinder. A key is used to rotate the lock cylinder between lock and unlock positions. The key may be removed and stored in a secure place after locking the lock assembly to prevent unauthorized removal of peripheral devices from the housing. Brackets are mounted on opposing sides of the housing to retain the lock bar and to provide guide slots for controlling movement of the lock bar between lock and unlock positions.

22 Claims, 4 Drawing Sheets

LINEAR SECURITY MECHANISM FOR ENCLOSURE

BACKGROUND OF THE INVENTION

1. Field of the Invention

This invention relates to computer equipment enclosures, and more particularly to locking mechanisms for retaining equipment in peripheral device bays.

2. Description of the Related Art

Computer systems including personal computers, workstations, servers, and embedded systems typically include a motherboard on which most of the fixed internal processing circuitry of the computer is mounted. While working memory (such as random access memory or RAM) may be mounted on the motherboard, permanent memory devices typically are not. Many computer systems are designed to have multiple peripheral devices, including memory devices, included in the system. A typical personal computer system includes a processor with associated memory, control logic, and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives and/or digital video/versatile disk (DVD) drives. Additionally, computer systems often have the capability to interface with external enclosures that include additional peripheral devices. One or more data busses are coupled to connectors that mate with connectors on the peripheral devices to enable electrical communication between the peripheral devices and the rest of the computer system.

Several computer systems are often connected to a central network server including one or more mass storage devices that is comprised of one or more removable disk drives in a mounting structure. There are many situations where it is desirable to provide a locking mechanism to prevent removal of one or more of the disk drives from the mounting structure. The size and shape of the of locking mechanism is often subject to physical constraints, however. For example, a locking door or cover may be attached to the bays containing the disk drives to prevent access to the drives, but this may cause overheating problems as the door reduces airflow circulation around electronic components and blocks visibility to drive activity and fault indicators. Further, disk drive space is typically at a premium in computer systems, and it is advantageous to provide a locking mechanism that allows as many disk drives as possible to occupy existing space without increasing the size of the mounting structure.

SUMMARY OF THE INVENTION

The present invention solves the shortcomings and deficiencies of the prior art by providing a lock assembly that may be integrated with existing mounting structures. In one embodiment, the present invention is designed for use with housing structures for peripheral devices that are connected to a computer system. The lock assembly is attached to the housing and includes a lock bar that is movable between a lock position for preventing removal of peripheral devices and an unlock position for allowing removal of the peripheral devices. The peripheral devices are typically disk storage drives that are mounted in peripheral device carriers. The peripheral device carriers provide structure for installing and removing the disk drives, and for retaining the drives in the housing. The lock assembly is designed to provide a mechanism for preventing unauthorized removal of disk drives and other peripheral devices that are installed in the housing.

In a further embodiment, the lock assembly includes a lock pin coupled to a lock cylinder wherein the lock cylinder can be rotated between a lock position and an unlock position. Rotating the lock cylinder to the lock position causes the lock pin to move linearly to engage the lock bar when the lock bar is in the lock position. The lock cylinder is rotated using a key that may be removed and stored in a secure location to help prevent unauthorized removal of peripheral devices from the housing.

In a further embodiment, the lock assembly includes a bracket attached to the housing. The lock bar is attached to the bracket so that it is movable between the lock and unlock positions.

Another feature of the bracket is a guidance slot to which an arm on the lock bar is movably fastened. The guidance slot allows the lock bar to move between the open and lock positions. The guidance slot may further include a detent portion for retaining the lock bar in the lock position.

In another embodiment, the bracket includes a linear slot and a curved slot, and the lock bar includes a bent arm having an elbow portion and an end portion. The elbow portion of the bent arm is movably fastened to the curved slot, and the end portion of the bent arm is movably fastened to the linear slot In another embodiment, the lock assembly includes a first bracket attached to one side of the housing, and a second bracket attached to another side of the housing opposite the first bracket. At least one of the first bracket and the second bracket includes a linear slot and a curved slot, and the lock bar includes a bent arm having an elbow portion and an end portion. The elbow portion of the bent arm is movably fastened to the curved slot and the end portion of the bent arm is movably fastened to the linear slot. The linear slot includes a detent portion for retaining the lock bar in the closed position.

In another embodiment, the lock assembly includes a first bracket attached to one side of the housing and a second bracket attached to another side of the housing opposite the first bracket. The first and second brackets each include a linear slot and a curved slot. The lock bar includes a first opposing end and a second opposing end.

The first opposing end has an arm portion that is movably fastened to the linear slot and to the curved slot of the first bracket. The second opposing end also has an arm portion that is movably fastened to the linear slot and the curved slot of the second bracket. The linear slots may include a detent portion for retaining the lock bar in the closed position.

Another feature of the lock assembly is a spring connected between the lock bar and the housing for facilitating movement of the lock bar between the lock position and the unlock position.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
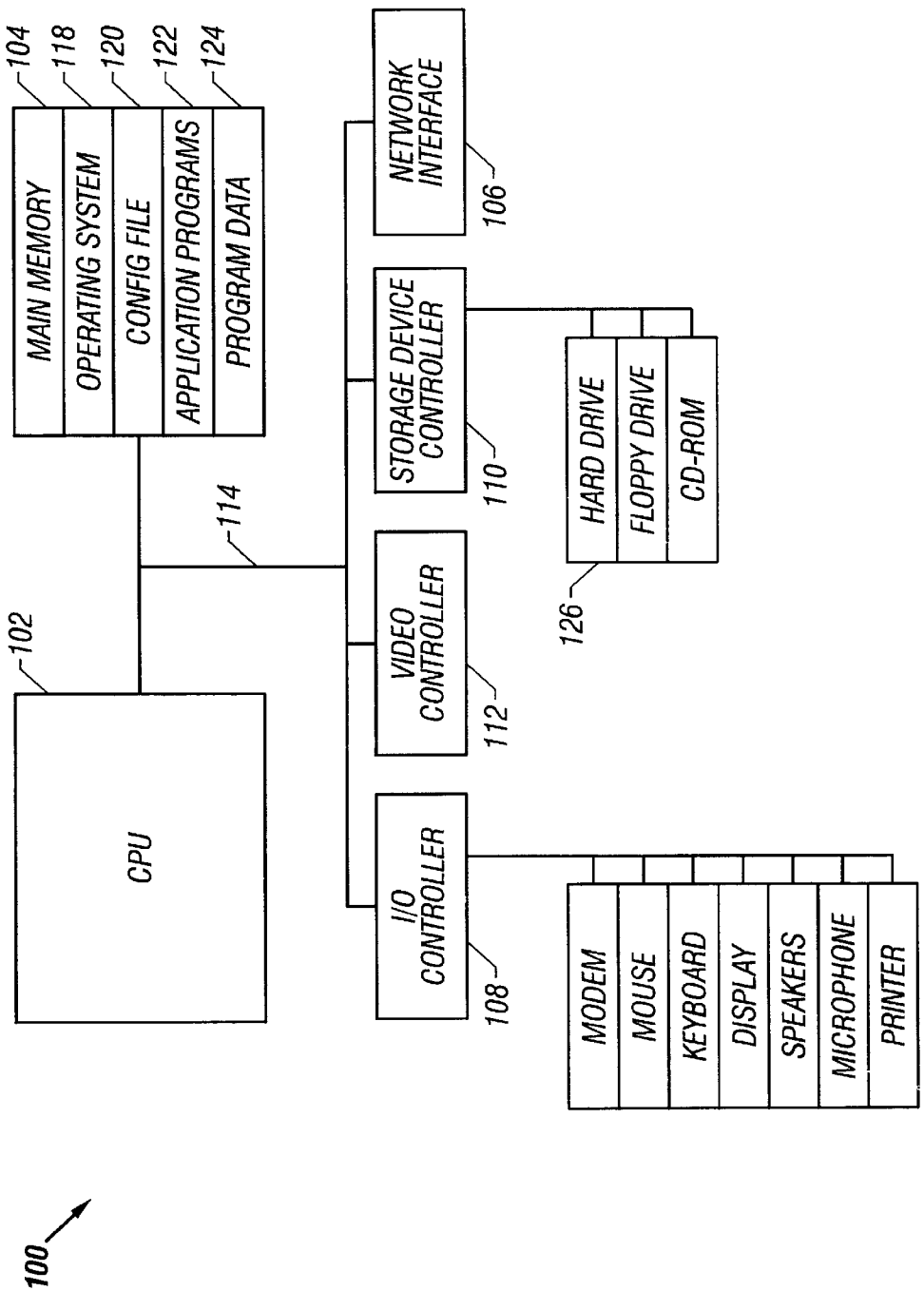
FIG. 1 is a block diagram of a computer system.

Referring to FIG. 1, components in computer system 100 includes a central processing unit (CPU) 102, main memory 104, network interface 106 and various special purpose controllers including one or more input/output (I/O) device controllers 108, storage device controllers 110, and video controller 112. System bus 114, representing one or more data busses that may be included in computer system 100, connects the components for electronic communication between them as required. I/O device controllers 108 are coupled as known to respective peripheral devices such as audio speakers, a microphone, a mouse, a keyboard, and a printer to allow a user to input data and receive information from computer system 100. Storage device controllers 110 may control the operation of different types of peripheral data storage devices such as hard disk drives, floppy disk drives, and compact disc drives. Computer system 100 may be a network server or one of many computer systems connected to a network server through network interface 106. Those skilled in the art will appreciate that this system encompasses all tppes of computer systems: personal computers, network servers, midrange computers, mainframes, etc.

CPU 102 can be constructed from one or more microprocessors and/or integrated circuits that are mounted on a motherboard (not shown). CPU 102 executes program instructions stored in main memory 104. Main memory 104 stores programs and data that the CPU 102 may access. When computer system 100 starts up, CPU 102 initially executes program instructions in operating system 118. Operating system 118 is a program that manages the resources of the computer system 100, such as the CPU 102, main memory 104, storage device controllers 110, network interface 106, and system bus 114. The operating system 118 reads one or more configuration files 120 to determine the hardware and software resources connected to the computer system 100. Main memory 104 includes operating system 118, the configuration file 120, one or more application programs 122, and program data 124. Operating system 118 is also capable of detecting when a peripheral device is connected to computer system 100 and to control operation of system components, such as a specific I/O device controller 108 or storage device controller 110 for operating with such peripheral devices.

When computer system 100 is used as a network server, storage device controllers 110 allow one or more computer systems 100 to retrieve and store data from auxiliary storage devices such as magnetic disks (hard disks, diskettes) and optical disks (CD-ROM). The mass storage devices are commonly known as Direct Access Storage Devices (DASD), and act as a permanent store of information. One suitable type of DASD is hard disk drive 126 that reads data from and writes data to a hard disk. The information from the DASD can be in many forms including application programs and program data. Data retrieved through storage device controllers 110 is usually placed in main memory 104 where CPU 102 can process it.

While main memory 104 and hard disk drive 126 are typically separate storage devices, computer system 100 may use known virtual addressing mechanisms that allow the programs of computer system 100 to behave as if they only have access to a large, single storage entity, instead of access to multiple, smaller storage entities. Therefore, while certain elements are shown to reside in main memory 104, those skilled in the art will recognize that these are not necessarily all completely contained in main memory 104 at the same time. It should be noted that the term "memory" refers to the entire virtual memory of computer system 100.

Figure 2A:
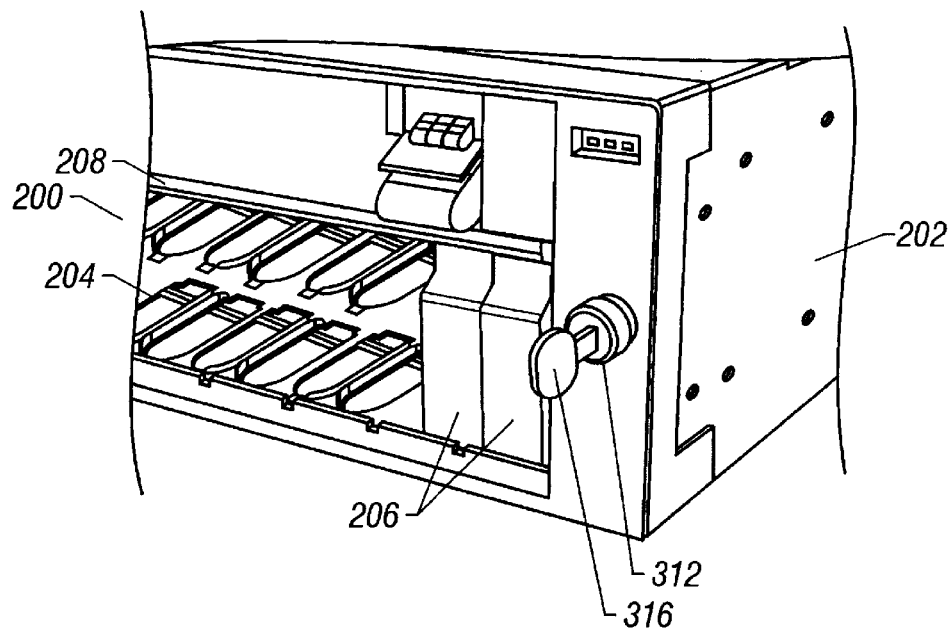
FIG. 2A is a perspective view illustrating an exemplary housing with peripheral device carriers and lock assembly installed with lock bar in the lock position.
Figure 2B:
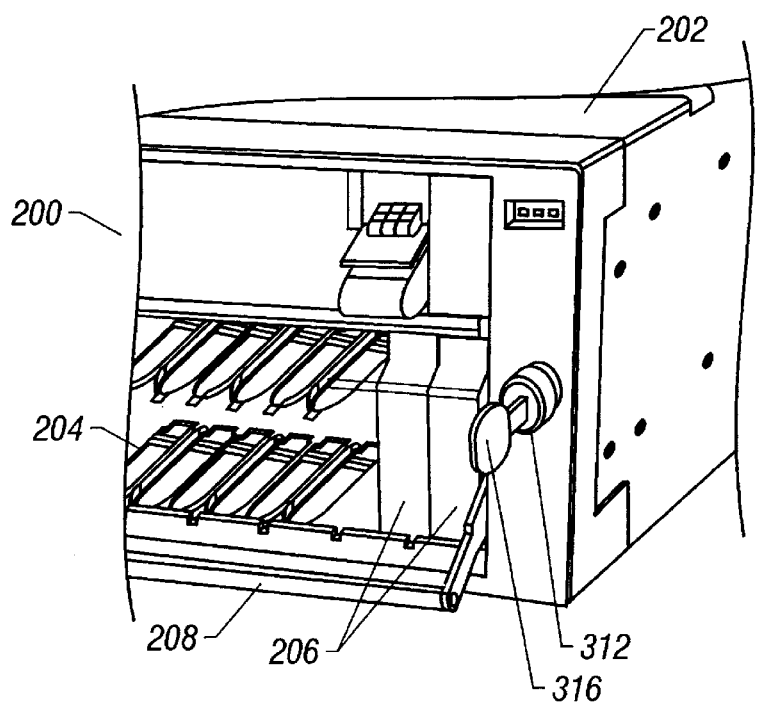
FIG. 2B is a perspective view illustrating an exemplary housing with peripheral device carriers and lock assembly installed with lock bar in the unlock position.

Referring now to FIGS. 2a and 2b, lock assembly 200 is attached or mounted in housing 202. Inner portion 204 of housing 202 includes a plurality of bays that are easily accessible by the user through the open side of housing 202. Peripheral device carriers 206 are used for convenient insertion and extraction of peripheral devices in the bays of housing 202. A peripheral device mounts on carrier 206 and carrier 206 slides into a bay in housing 202. FIGS. 2a and 2b show two device carriers 206 installed in housing 202.

Lock assembly 200 includes lock bar 208 which is movable between a lock position as shown in FIG. 2a for preventing removal of peripheral device carriers 206 and an unlock position as shown in FIG. 2b for allowing removal of the peripheral device carriers 206.

Figure 3:
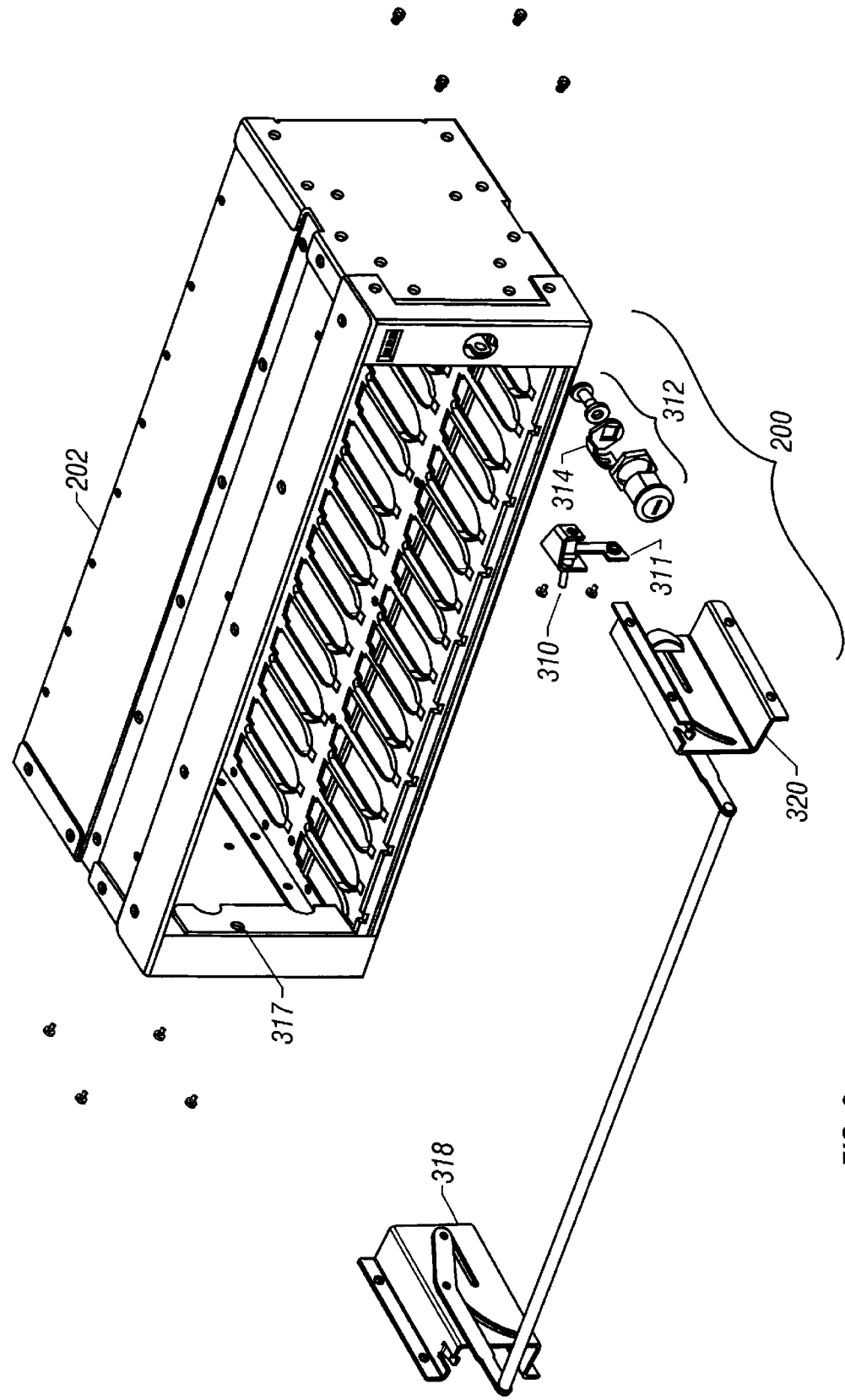
FIG. 3 is a perspective view of a lock bar connected to brackets and an exploded perspective view of a lock pin and lock cylinder.

Referring now to FIG. 3, lock assembly 200 includes lock pin 310 and lock cylinder 312, which is shown in exploded perspective view. Lock cylinder 312 is also rotateable between a lock position and an unlock position. Lock pin 310 is held in lock pin assembly 311 and is coupled to pawl 314 in lock cylinder 312 as known in the art. Lock pin assembly 311 is attached to housing 202 so that lock pin 310 engages one end of lock bar 208 as described herein below when lock cylinder 312 is rotated to the lock position. Lock cylinder 312 is shown in FIG. 2a–FIG. 3 as a conventional locking mechanism that is rotated using key 316. It is recognized that any type of electronically or mechanically actuated locking mechanism that is capable of moving lock pin 310 in a substantially linear direction may be utilized in the present invention as an alternative to lock cylinder 312.

Figure 4:
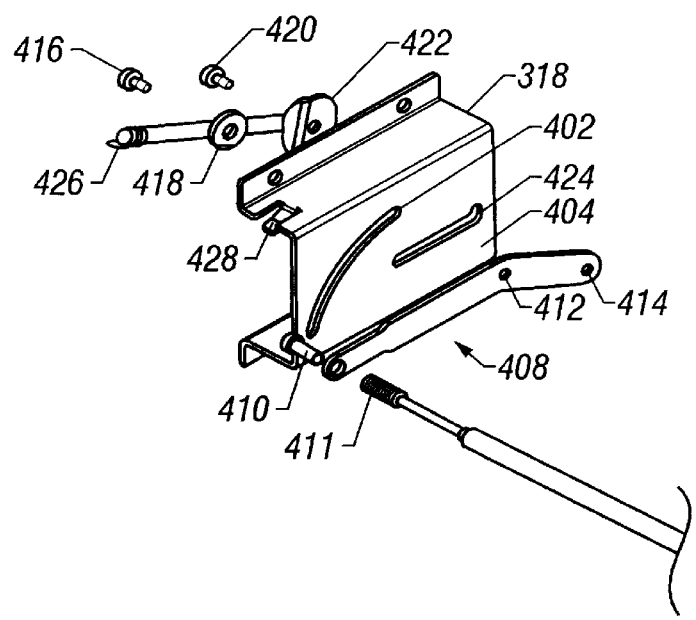
FIG. 4 is a perspective view of an attachment bracket with guidance slots for controlling movement of the lock bar when it is attached to the bent arm.
Figure 5:
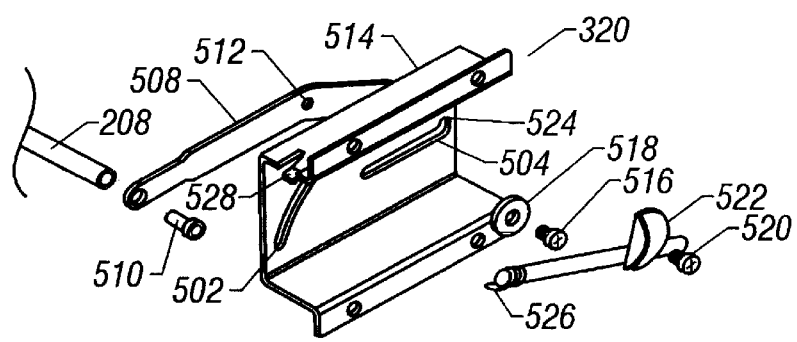
FIG. 5 is a perspective view of another attachment bracket with guidance slots for controlling movement of the lock bar when it is attached to the bent arm.

In FIGS. 4 and 5, the ends of lock bar 208 are connected to bent arms 408, 508 using hollow grommets 410, 510, respectively. In one embodiment, lock bar 208 is a hollow cylinder and includes internal rod 411. Spring 413 biases internal rod 411 inside lock bar 208 in the unlock position. When lock bar 208 is aligned in lock position, lock pin 310 moves into the hollow inner portion of lock bar 208 through the opening in grommet 510 and exerts force on one end of internal rod 411. The force from lock pin 310 pushes the other end of internal rod 411 partially out of lock bar 208 and into an opening 317 (FIG. 3) in housing 202. Lock bar 208 is thus held in lock position when lock pin 310 is engaged in one end of lock bar 208, and the other end of internal rod 411 is engaged in the opening 317 in housing 202. Other mechanisms or fasteners may be utilized to connect the ends of lock bar 208 to bent arms 408, 508, including forming lock bar 208 and bent arms 408, 508 as a unitary structure such as by injection molding.

In one embodiment, lock assembly 200 is attached to housing 202 utilizing first bracket 318 attached to one side of housing 202 and second bracket 320 attached to another side of housing 202 opposite first bracket 318. As best shown in FIGS. 4 and 5, first bracket 318 and second bracket 320 each include one curved slot 402, 502, respectively, and one linear slot 404, 504, respectively.

Bent arm 408 includes elbow portion 412 and end portion 414. A combination pin and fastener, such as thumbscrews 416, 420 and washers 418, 422 are used to movably connect bent arm 408 to bracket 318. The pin portions of thumbscrews 416, 420 are inserted through washers 418, 422 and slots 402, 404, respectively. Elbow portion 412 and end portion 414 of bent arm 410 include a threaded opening to receive a threaded portion of thumbscrew 416 in conventional manner.

In FIG. 5, bent arm 508 is coupled to bracket 320 in a similar manner that bent arm 408 is coupled to bracket 318. Bent arm 508 includes elbow portion 512 and end portion 514. A combination pin and fastener, such as thumbscrews 516, 520 and washers 518, 522 are used to movably connect bent arm 508 to bracket 318. The pin portions of thumbscrews 516, 520 are inserted through washers 518, 522 and slots i=502, 504, respectively. Elbow portion 512 and end portion 514 of bent arm 510 include a threaded opening to receive a threaded portion of thumbscrew 516 in conventional manner.

Linear slots 404, 504 include detents 424, 524 to engage the pin portion of thumbscrews 420, 520 and to place lock bar 208 in position to receive lock pin 310 when lock cylinder 312 is rotated to the lock position. The user taps lock bar 208 to disengage the pin portion of thumbscrews 420, 520 from detents 424, 524 to move lock bar 208 from the lock position.

In another embodiment, lock assembly 200 includes one or more springs 426, 526 to facilitate moving lock bar 208 between the lock position and the unlock position. Springs 426, 526 include loops at opposing ends that are used to attach springs 426, 526 to brackets 318, 320, respectively. The loop at one end of spring 426 is engaged by tab 428 on bracket 318. In one embodiment, tab 428 is formed by making two cuts in the edge of the upper side of bracket 318, and bending the material between the cuts away from the upper side of bracket 318. It is realized, however, that tab 428 may be formed using many different alternatives including fastening another portion of material at the desired location on bracket 318.

Another alternative for attaching spring 426 using other types of fasteners includes forming a threaded opening at a desired location on bracket 318, inserting the threaded portion of a screw through the loop at the end of spring 426, and engaging the threading portions of the screw and opening to retain spring 426.

A further alternative is to combine different methods for attaching the springs such as shown in FIGS. 4 and 5 wherein the loop at one end of springs 426, 526 is to be attached to tabs 428, 528, respectively, while the loop at the opposite end of springs 426, 526 is to be attached to the openings at end portions 414, 514 in bent arms 408, 508 using thumbscrews 420, 520.

In a further embodiment, only one bracket 320 is used to movably attach one end of lock bar 208, leaving the opposing end of lock bar 208 unattached. In this embodiment, it is important for the bracket to be positioned proximate lock cylinder 312 so that lock pin 310 can engage lock bar 208 to prevent removal of peripheral devices 206.

Figure 6:
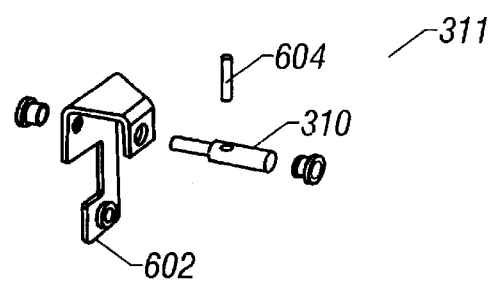
FIG. 6 is an exploded perspective view of the retaining and guidance structure for the lock pin.

Lock pin assembly 600 is shown in FIG. 6 including lock pin 310, bracket 602, and push pin 604. Lock pin 310 includes a cavity along its transverse length that receives one end of push pin 604. Pawl 314 includes a first opening to engage the other end of push pin 604, and a second opening to receive lock pin 310. The first opening is sized so that it is slightly larger than the diameter of push pin 604. When lock cylinder 312 is rotated, the sides of the first opening exerts force on push pin 604, thereby causing lock pin 310 to move in a linear direction. The second opening in pawl 314 is sized to allow pawl 314 to rotate around lock pin 310 when lock cylinder 312 is rotated.

In an alternative embodiment, bracket 320 may include just one guidance slot, such as curved slot 502 for guiding the movement of lock bar 208 between lock position and unlock position. When one guidance slot is utilized, only fastener is required to movably fasten arm 508 to bracket 320. Likewise, in an embodiment having two brackets, each bracket may include only one guidance slot, thereby alleviating the structure and cost of two additional fasteners.

In another embodiment, an arm having an alternative shape to bent arm 508 may be incorporated, such as a straight arm or a curvilinear arm. It is recognized that various combinations of arm shapes and number and shape of guidance slots may be utilized with the present invention without departing from the scope of the invention.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A computer system comprising:

a processor;

a memory coupled to the processor;

a peripheral device having a first connector for electronically coupling the peripheral device to the processor, a peripheral device carrier, the peripheral device being mounted in the peripheral device carrier;

a housing including a bay having at least one opening for receiving the peripheral device carrier; and a lock assembly attached to the housing, the lock assembly including a lock bar, the lock bar being movable between a lock position for preventing removal of the peripheral device carrier and an unlock position for allowing removal of the peripheral device carrier, wherein the lock bar includes an internal rod that engages an opening in the housing when moved to the lock position.

2. The computer system, as recited in claim 1, wherein the lock assembly further includes a lock pin and a lock cylinder, the lock cylinder being rotatable between a lock position and an unlock position, the lock pin being coupled to the lock cylinder, the lock pin engaging the lock bar when the lock cylinder is rotated to the lock position.

3. The computer system, as recited in claim 1, wherein the lock assembly further includes:

a bracket attached to the housing, the lock bar being movably attached to the bracket.

4. The computer system, as recited in claim 3, wherein the bracket includes a guidance slot and the lock bar includes an arm the arm being movably fastened to the guidance slot.

5. The computer system, as recited in claim 4, wherein the guidance slot includes a detent portion for retaining the lock bar in the lock position.

6. The computer system, as recited in claim 3, wherein the bracket includes a linear slot and a curved slot, and the lock bar includes a bent arm having an elbow portion and an end portion, wherein the elbow portion of the bent arm is movably fastened to the curved slot and the end portion of the bent arm is movably fastened to the linear slot.

7. The computer system, as recited in claim 1, wherein the lock assembly further includes:

a first bracket attached to one side of the housing;

a second bracket attached to another side of the housing opposite the first bracket;

wherein at least one of the first bracket and the second bracket includes a linear slot and a curved slot, and the lock bar includes a bent arm having an elbow portion and an end portion, wherein the elbow portion of the bent arm is movably fastened to the curved slot and the end portion of the bent arm is movably fastened to the linear slot.

8. The computer system, as recited in claim 7, wherein the linear slot includes a detent portion for retaining the lock bar in the lock position.

9. The computer system, as recited in claim 1, wherein the lock assembly further includes:

a first bracket attached to one side of the housing; and a second bracket attached to another side of the housing opposite the first bracket;

wherein the first bracket includes a linear slot and a curved slot, the second bracket includes a linear slot and a curved slot, and the lock bar includes a first opposing end and a second opposing end, the first opposing end having an arm portion movably fastened to the linear slot and to the curved slot of the first bracket, and the second opposing end having an arm portion movably fastened to the linear slot and to the curved slot of the second bracket.

10. The computer system, as recited in claim 9, wherein the linear slot includes a detent portion for retaining the lock bar in the lock position.

11. The computer system, as recited in claim 1, wherein the lock assembly further includes:

a spring connected to the lock assembly for facilitating movement of the lock bar between the lock position and the unlock position.

12. A lock assembly for retaining peripheral devices for a computer system, the lock assembly comprising:

a housing having an opening and an inner portion for receiving a peripheral device; and a lock assembly attached to the housing, the lock assembly including a lock bar, the lock bar being movable between a lock position for preventing removal of the peripheral device and an unlock position for allowing removal of the peripheral device carrier, wherein the lock bar includes an internal rod that engages an opening in the housing when moved to the lock position.

13. The lock assembly, as recited in claim 12, wherein the lock assembly further includes a lock pin and a lock cylinder, the lock cylinder being rotatable between a lock position and an unlock position, the lock pin being coupled to the lock cylinder to engage the lock bar when the lock cylinder is rotated to the lock position.

14. The lock assembly, as recited in claim 12, wherein the lock assembly further includes:

a bracket attached to the housing, the lock bar being movably fastened to the bracket.

15. The lock assembly, as recited in claim 14, wherein the bracket includes a guidance slot and the lock bar includes an arm, the arm being movably fastened to the guidance slot.

16. The lock assembly, as recited in claim 15, wherein the guidance slot includes a detent portion for retaining the lock bar in the lock position.

17. The lock assembly, as recited in claim 14, wherein the bracket includes a linear slot and a curved slot, and the lock bar includes a bent arm having an elbow portion and an end portion, wherein the elbow portion of the bent arm is movably fastened to the curved slot and the end portion of the bent arm is movably fastened to the linear slot.

18. The lock assembly, as recited in claim 12, wherein the lock assembly further includes:

a first bracket attached to one side of the housing;

a second bracket attached to another side of the housing opposite the first bracket;

wherein at least one of the first bracket and the second bracket includes a linear slot and a curved slot, and the lock bar includes a bent arm having an elbow portion and an end portion, wherein the elbow portion of the bent arm is movably fastened to the curved slot and the end portion of the bent arm is movably fastened to the linear slot.

19. The lock assembly, as recited in claim 18, wherein the linear slots include a detent portion for retaining the lock bar in the lock position.

20. The lock assembly, as recited in claim 12, wherein the lock assembly further includes:

a first bracket attached to one side of the housing; and a second bracket attached to another side of the housing opposite the first bracket;

wherein the first bracket includes a linear slot and a curved slot, the second bracket includes a linear slot and a curved slot, and the lock bar includes a first opposing end and a second opposing end, the first opposing end having an arm portion movably fastened to the linear slot and to the curved slot of the first bracket, and the second opposing end having an arm portion movably fastened to the linear slot and to the curved slot of the second bracket.

21. The lock assembly, as recited in claim 20, wherein the linear slot includes a detent portion for retaining the lock bar in the lock position.

22. The lock assembly, as recited in claim 12, wherein the lock assembly further includes:

a spring connected to facilitate movement of the lock bar between the lock position and the unlock position.

* * * * *